United States Patent
Lin

(10) Patent No.: US 11,979,720 B2
(45) Date of Patent: May 7, 2024

(54) LOUDSPEAKER CONTROL SYSTEM

(71) Applicant: Alpha Networks Inc., Hsinchu (TW)

(72) Inventor: Tzu-Chih Lin, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 145 days.

(21) Appl. No.: 17/832,725

(22) Filed: Jun. 6, 2022

(65) Prior Publication Data
US 2023/0064050 A1    Mar. 2, 2023

(30) Foreign Application Priority Data

Aug. 31, 2021  (TW) ................. 110132320

(51) Int. Cl.
| | |
|---|---|
| *H04R 3/00* | (2006.01) |
| *G06T 7/60* | (2017.01) |
| *G06T 7/70* | (2017.01) |
| *H04N 5/33* | (2023.01) |
| *H04R 1/32* | (2006.01) |

(52) U.S. Cl.
CPC ............. *H04R 3/00* (2013.01); *G06T 7/60* (2013.01); *G06T 7/70* (2017.01); *H04N 5/33* (2013.01); *H04R 1/323* (2013.01); *G06T 2207/10048* (2013.01); *H04R 2430/01* (2013.01)

(58) Field of Classification Search
CPC ...... H04R 3/00; H04R 1/323; H04R 2430/01; G06T 7/70; G06T 7/60; G06T 2207/10048; H04N 5/33
USPC ........................................................ 381/107
See application file for complete search history.

(56) References Cited

U.S. PATENT DOCUMENTS

| | | | |
|---|---|---|---|
| 2017/0188171 A1* | 6/2017 | Ishida | ............ H04R 3/12 |
| 2019/0356985 A1 | 11/2019 | Milne et al. | |
| 2021/0211824 A1 | 7/2021 | Reilly et al. | |

FOREIGN PATENT DOCUMENTS

| | | |
|---|---|---|
| CN | 102262876 | 10/2013 |
| TW | 201931862 | 8/2019 |
| TW | M599457 | 8/2020 |

OTHER PUBLICATIONS

TW Notice of Allowance issued on Sep. 29, 2022.

* cited by examiner

*Primary Examiner* — Paul Kim
(74) *Attorney, Agent, or Firm* — WPAT, P.C

(57) ABSTRACT

A system for automatically adjusting a volume of a loudspeaker includes a loudspeaker and a processor. An infrared sensor, which generates a sensing signal when sensing IR radiation from a heat-radiating source, is disposed on the loudspeaker. The sensing signal provides a size information commensurate with a size of the heat-radiating source. The processor receives a plurality of the sensing signals at different time points to obtain a plurality of corresponding size information, realizes a change of distance between the heat-radiating source and the loudspeaker according to a change of the size information, and generates a volume-adjusting signal according to the change of distance between the heat-radiating source and the loudspeaker. The volume-adjusting signal is transmitted to the loudspeaker to adjust the volume of the loudspeaker accordingly.

18 Claims, 8 Drawing Sheets

LOUDSPEAKER CONTROL SYSTEM

FIELD OF THE INVENTION

The present invention relates to a loudspeaker control system, and more particularly to a system for automatically adjusting volume of a loudspeaker.

BACKGROUND OF THE INVENTION

A loudspeaker is known to function for converting electronic signals into sound, and has been commonly used in a variety of fields. Furthermore, a plurality of loudspeakers can be grouped and allocated into a stereo system to create a good environment for people to enjoy an auditory feast. For perfecting the performance of the stereo system, the configuration of sound of the loudspeakers is as critical as the quality of each loudspeaker itself.

Sometimes, relative positions and respective orientations and volumes of the loudspeakers need to be manually adjusted while playing music in order to optimize the auditory performance of the stereo system. Once the listener moves to another place, the sounding parameters of the loudspeaker might become not balanced anymore and need to make adjustment again. This is quite troublesome for listeners and causes bothering interruption.

SUMMARY OF THE INVENTION

Therefore, the present invention provides a system for automatically adjusting volume of a loudspeaker in order to adapt the output of the loudspeaker to the position of a user.

The present invention also provides a loudspeaker control device, which can not only automatically adjusting volume of a loudspeaker but also automatically adjusting orientation of the loudspeaker in order to adapt the output of the loudspeaker to the position of a user.

In an aspect of the present invention, a loudspeaker control system includes a loudspeaker; a detecting device generating at least two sensing signals in response to presence of a target object in a sensing area at sequential time points, each of the at least two sensing signal containing a size information of the target object; and a processor electrically connected to the detecting device, receiving the at least two sensing signals, and optionally generating an adjustment signal for adjusting at least one parameter of the loudspeaker according to the size information of the target object contained in the at least two sensing signals.

In another aspect of the present invention, a system for automatically adjusting a volume of a loudspeaker includes a loudspeaker disposed thereon an infrared sensor, which generates a first sensing signal when sensing IR radiation from a first heat-radiating source, wherein the first sensing signal provides at least a first size information commensurate with a size of the first heat-radiating source; and a processor electrically connected to the infrared sensor, receiving a plurality of the first sensing signals at different time points to obtain a plurality of corresponding first size information, realizing a change of distance between the first heat-radiating source and the loudspeaker according to a change of the first size information, and generating a volume-adjusting signal according to the change of distance between the first heat-radiating source and the loudspeaker. The volume-adjusting signal is transmitted to the loudspeaker to adjust the volume of the loudspeaker accordingly.

BRIEF DESCRIPTION OF THE DRAWINGS

The invention will become more readily apparent to those ordinarily skilled in the art after reviewing the following detailed description and accompanying drawings, in which.

DETAILED DESCRIPTION OF PREFERRED EMBODIMENTS

The invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

It is understood by those skilled in the art, the term "electrically coupled" used hereinafter indicates that the electronic signal can be transmitted between two objects, either by wired or wireless means, and in either a unidirectional or bidirectional manner.

Figure 1:
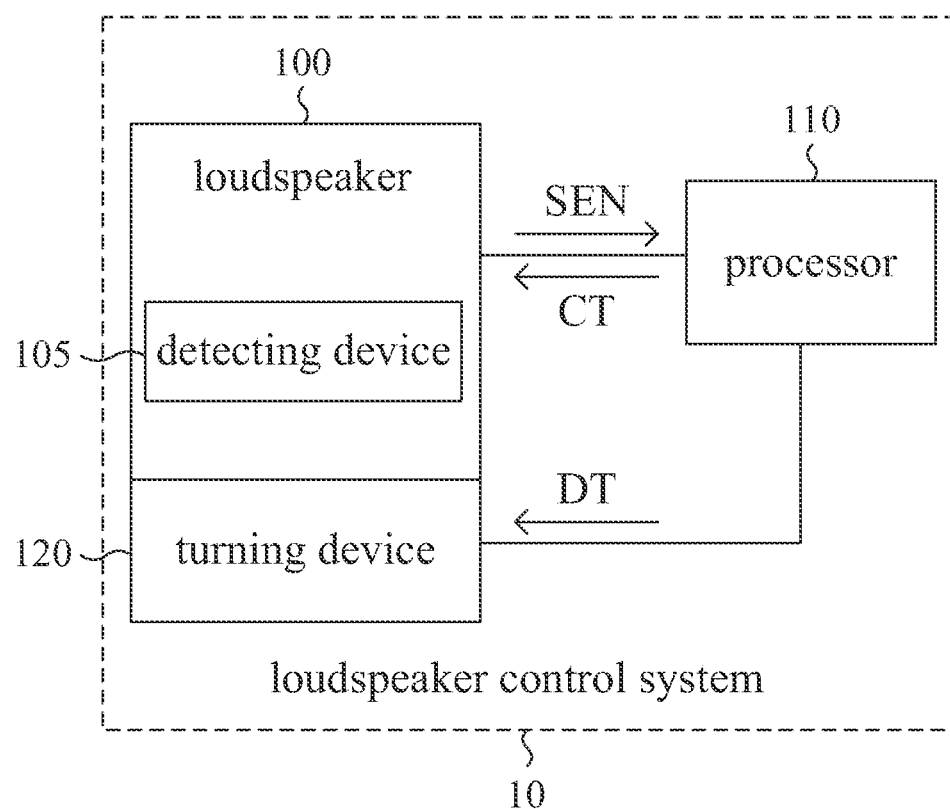
FIG. 1 is a circuit block diagram schematically illustrating a loudspeaker control system for automatically adjusting volume of a loudspeaker according to an embodiment of the present invention.

Please refer to FIG. 1, which is a circuit block diagram schematically illustrating a loudspeaker control system for automatically adjusting volume of a loudspeaker according to an embodiment of the present invention. The loudspeaker control system 10 includes a loudspeaker 100, a detecting device 105 and a processor 110. The detecting device 105 functions for detecting a specific type of object, which in this embodiment, is a human being. In an example, the detecting device 105 includes an infrared (IR) sensor, which generates a sensing signal indicative of a heat-radiating source, e.g., a human body. To avoid the loudspeaker control system from being improperly actuated, the detecting device 105 may further includes discriminating means, which determines whether the detected heat radiation conforms to the human body temperature. The detecting device 105 will generate a sensing signal corresponding to the heat-radiating source if the detected heat radiation conforms to the human body temperature. Otherwise, the detecting device 105 will not generate the sensing signal. Alternatively, the detecting device 105 may include a pyroelectric infrared (PIR) sensor, which is a motion sensor conducting detection only at the moment when there is a temperature change. In an embodiment, the detecting device 105 synchronously moves or turns with the loudspeaker 100. For example, the detecting device 105 is disposed in or mounted on a housing of the loudspeaker 100, and whenever the housing of the loudspeaker 100 is moved or turned, the detecting device 105 is transmitted by the housing of the loudspeaker 100 to move or turn to a corresponding position or direction. In other words, the detecting device 105 is kept fixed relative to the loudspeaker 100 to continuously perform sensing operations. In another embodiment, the detecting device 105 is actuated in response to the moving or turning action of the loudspeaker 100 but does not move or turn in synchronization with the loudspeaker 100. For example, the loudspeaker 100 turns first, and then the detecting device 105 turns and generates the sensing signal indicative of the detected heat-radiating source when reaching in a specific spatial relationship to the loudspeaker 100, e.g., both facing in the same direction.

Figure 2A:
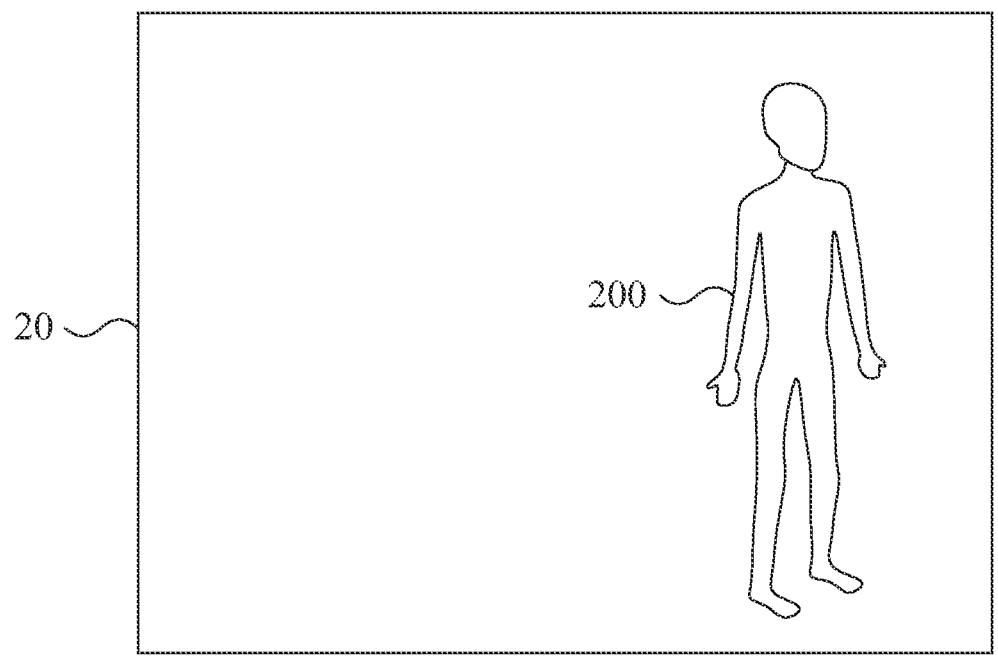
FIGS. 2A-2C are schematic diagrams illustrating detected images of a heat-radiating source at three different time points.
Figure 2B:
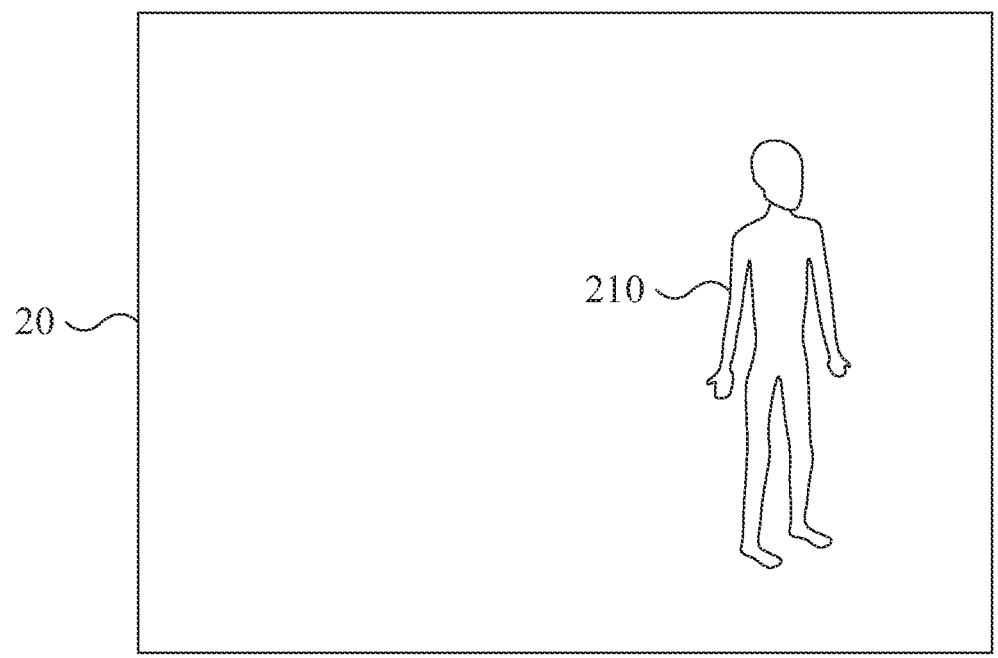

Please refer to FIG. 2A and FIG. 2B. FIG. 2A schematically shows a detected image 200 of a heat-radiating source rendered by the detecting device 105 at a first time point, and FIG. 2B schematically shows a detected image 200 of the heat-radiating source rendered by the detecting device 105 at a second time point. For purpose of illustration, the images as shown in FIGS. 2A and 2B are presented in a form of contours of the sensed objects. At the first time point, if the detecting device 105 determines the detected heat-radiating source is a human being, the detecting device 105 will generate a first sensing signal SEN1 commensurate with a size of the detected image 200. Likewise, at the subsequent second time point, the detecting device 105 will generate a second sensing signal SEN2 commensurate with a size of the detected image 210. Then the first sensing signal SEN1 and the second sensing signal SEN2 will be transmitted to the processor 110 to be analyzed. The processor 110 realizes and compares respective size information of the detected images 200 and 210 from the first and second sensing signals SEN1 and SEN2. In this example, the detected image 210 is smaller than the detected image 200. Since the detected images 200 and 210 are originated from the same heat-radiating person, it is inferable that the reduction of image size results from a distance change of the heat-radiating person from the detecting device 105. In other words, the heat-radiating person is moving away from the detecting device 105, as well as the loudspeaker 100, where the detecting device 105 is disposed, during the period from the first time point to the second time point. As mentioned above, the auditory performance of a stereo system can be enhanced by adaptively adjusting one or more parameters of the loudspeaker in connection with a specified user. Therefore, the loudspeaker control system according to the present invention dynamically adjusts the parameter or parameters of the loudspeaker 100 according to the spatial relationship of the user relative to the loudspeaker 100, which is realized by way of the detected change of images. In this embodiment, the parameter of the loudspeaker 100 to be adjusted is a volume of the loudspeaker 100, and the spatial relationship of the user relative to the loudspeaker 100 is a change of distance of the user from the loudspeaker 100. The processor 110 outputs a volume-adjusting signal CT to the loudspeaker 100 when determining the distance of the user from the loudspeaker 100 is changed, and then the volume of the loudspeaker 100 is dynamically adjusted in response to the volume-adjusting signal CT.

The adjustment of the volume of the loudspeaker is dynamically made in order to keep the volume of the loudspeaker 100, which is sensed by the user, substantially constant even if the distance of the user from the loudspeaker 100 changes. The rules of adjustment may vary with practical conditions and/or requirements, e.g., depending on physical structure and/or material of the loudspeaker, and/or audio effects to be contributed to the stereo system by the loudspeaker. In one of the exemplified adjustment rules, a change amount of the volume of the loudspeaker 100 varies proportionally with the shift amount of the user. In another example, the volume of the loudspeaker 100 may be switched to predetermined settings corresponding to the shift level of the user or the position of the user in the environment.

Figure 2C:
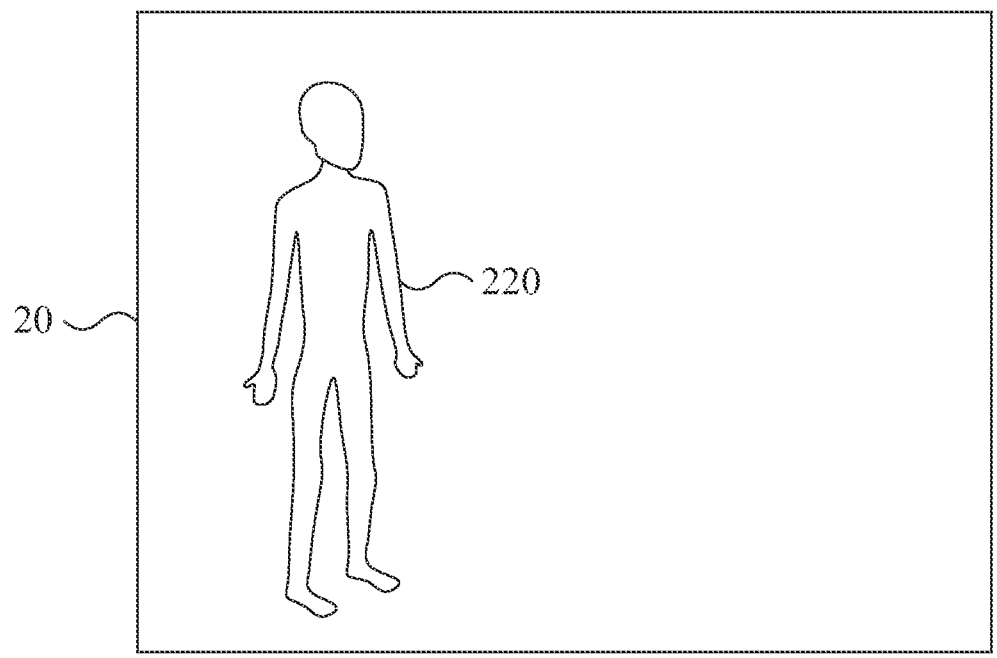

Please refer to FIG. 1 and FIG. 2A again, as well as FIG. 2C, which schematically shows a detected image 220 of the heat-radiating source rendered by the detecting device 105 at a third time point later than the first time point. At the third time point, the detecting device 105 generates a third sensing signal SEN3 commensurate with a size of the detected image 220. Likewise, the image as shown in FIG. 2C is presented in a form of contour of the sensed objects. Compare the image 200 shown in FIG. 2A and the image 220 shown in FIG. 2C. The size of the image 220 is almost the same as that of the image 200 but located at different positions in the sensing area. Therefore, it is determined that the distance of the sensed object from the loudspeaker 100 at the first time point and the distance of the sensed object from the loudspeaker 100 at the third time point are equal, but an angular movement about the loudspeaker 100 occurs within a duration from the first time point to the third time point. It is understood that the audio effect of the loudspeaker 100 sensed by the user would be optimal if the loudspeaker 100 is oriented to the user, i.e., the sound is transmitted in a direction toward the user. Therefore, assuming that the loudspeaker 100 has been oriented to the user at the first time point, it is preferable to have the loudspeaker 100 turned a specified angle corresponding to the angular movement of the user within the duration from the first time point to the third time point to have the loudspeaker 100 oriented to the user again. In other words, in this embodiment, the parameter of the loudspeaker 100 to be adjusted is an orientation of the loudspeaker 100, and the spatial relationship of the user relative to the loudspeaker 100 is a change of direction of the user relative to the loudspeaker 100.

In this embodiment, the loudspeaker control system 10 further includes a turning device 120, which is physically connected to the loudspeaker 100 and electrically coupled to the processor 110. Once the processor 110 determines, according to the image 220 sensed by the detecting device 105 and previously detected image or images, that the orientation of the loudspeaker 100 needs to be adjusted, the processor 110 outputs a turning signal DT to the turning device 120. Then the tuning device 120 changes the orientation of the loudspeaker 100 in response to the turning signal DT. The rules of turning may vary with practical conditions and/or requirements. For example, a turning angle of the loudspeaker 100 varies proportionally with the angular movement amount of the user relative to the loudspeaker 100. In another example, the loudspeaker 100 is turned to predetermined settings corresponding to the angular movement level of the user relative to the loudspeaker 100.

Figure 3:
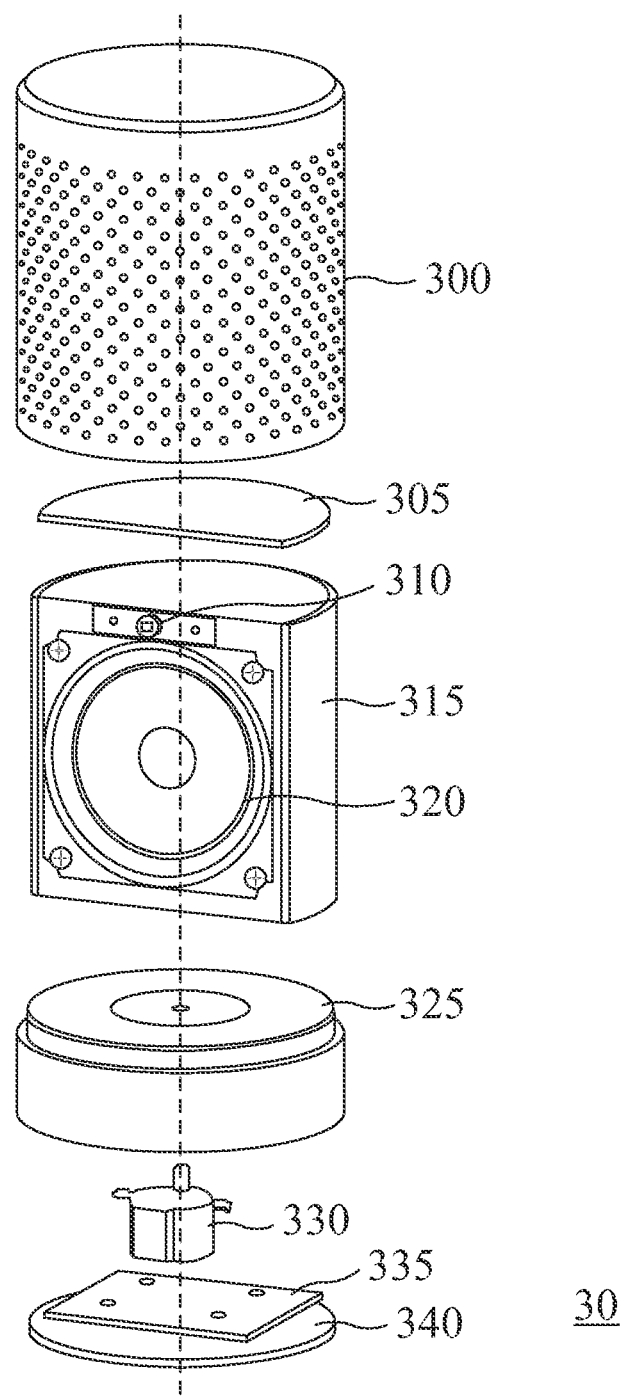
FIG. 3 is a schematic diagram showing parts breakdown illustration of a loudspeaker control system according to an embodiment of the present invention.

Please refer to FIG. 3, which schematically show parts breakdown illustration of a loudspeaker control system 30 according to an embodiment of the present invention. The loudspeaker control system 30 can execute functions of the loudspeaker control system 10 as described above. The loudspeaker control system 30 includes a loudspeaker 320 and a detecting device 310, and a processor and controller (not shown) installed on a circuit board 335 for conducting the detecting and adjusting operations described above. The loudspeaker 320 and the detecting device 310, e.g., a PIR sensor, are both fixed by a bracket 315. The bracket 315 with the loudspeaker 320 and the detecting device 310 is clamped between an upper cover 305 and a lower seat 325, and sleeved with a protective case 300. The lower seat 325 is connected to a step motor 330 and transmitted by the step motor 330, which is controlled by the processor and controller on the circuit board 335, to turn the bracket 315 as well as the loudspeaker 320 and the detecting device 310 to a designated orientation.

In this embodiment, the circuit board 335, where the processor and controller are disposed, is disposed in a space between the lower seat 325 and a bottom plate 340 covering the space. As such, the circuit board 335 can be integrated to the bracket 315 together with the loudspeaker 320. Alternatively, the circuit board 335 may be disposed in a separate location or housing from the loudspeaker 320.

Referring to FIG. 1 again, it is understood from the above descriptions that along with transmission of electrical sensing signals, which are generated at different time points from the detecting device 105, to the processor 110, the spatial relationship of the user relative to the loudspeaker 100 can be realized or derived by the processor 110. The spatial relationship information, as exemplified in the above embodiments, is a change of distance of the user from the loudspeaker 100 and/or a change of direction of the user from the loudspeaker 100. In response to the spatial relationship information, the parameter or parameters of the loudspeaker 100, e.g., volume and/or orientation, are calculated by the processor 110 and automatically adjusted so as to optimize sounding effects sensed by the user. According to the present invention, the conditions or levels of volume adjustment and/or orientation adjustment may be set by the user in advance, or default settings may be used.

In the above embodiments, a single heat-radiating source, e.g., one human body, is illustrated. Nevertheless, the loudspeaker control system according to the present invention is still feasible when two or more heat-radiating sources are present in the sensing area. Hereinafter, two heat-radiating sources are exemplified for illustration.

When a first heat-radiating source and a second heat-radiating source are both in the sensing area, the detecting device 105 would detect the IR radiation from the first heat-radiating source as well as the IR radiation from the second heat-radiating source. Accordingly, sensing signals corresponding to the first heat-radiating source, which are generated by the detecting device 105 at different time points, are used to determine the spatial relationship of the first heat-radiating source relative to the loudspeaker 100. Likewise, sensing signals corresponding to the second heat-radiating source, which are generated by the detecting device 105 at different time points, are used to determine the spatial relationship of the second heat-radiating source relative to the loudspeaker 100. In an embodiment, the parameter adjustment of the loudspeaker 100 is conducted in response to only the spatial relationship of a designated one of the first and second heat-radiating sources, i.e., either the first heat-radiating source or the second heat-radiating source, relative to the loudspeaker 100. For example, only the heat-radiating source detected first or only the heat-radiating source moved first is considered for parameter adjustment. In another embodiment, parameter adjustment of the loudspeaker 100 is conducted in a coordinated manner based on respective spatial relationships of the first and second heat-radiating sources relative to the loudspeaker 100, which will be exemplified hereinafter.

For example, when the respective spatial relationships are changes of distances from the first and second heat-radiating sources to the loudspeaker 100, the processor 110 determines a middle point between the estimated positions of the first and second heat-radiating sources. Then the processor 110 outputs the volume-adjusting signal CT to the loudspeaker 100 to adapt volume to the middle point.

In another example that the respective spatial relationships are changes of orientations of the first and second heat-radiating sources from the loudspeaker 100, the processor 110 determines an angular range between the estimated directions of the first and second heat-radiating sources relative to the loudspeaker 100. Then the processor 110 outputs the orientation-adjusting signal CT' to the loudspeaker 100 to adapt orientation of the loudspeaker to the angular range. For example, the turning device 120 moves the loudspeaker 100 to a middle angle of the angular range.

It is understood that volume and orientation of the loudspeaker 100 may both be adjusted if the spatial relationship indicates both distance and direction changes. For a stereo system consisting of a plurality of loudspeakers, a single processor may be used to control all the loudspeakers. Alternatively, a group of processors may be used to control the loudspeakers, respectively. Furthermore, the loudspeaker control system according to the present invention can still be applied, in a similar way described above, when more than two heat-radiating sources are in the same sensing area.

For example, when the infrared sensor senses IR radiation from additional heat-radiating sources in addition to the IR radiation from the first heat-radiating source, the infrared sensor generates additional sensing signals corresponding to the IR radiation of the additional heat-radiating sources, respectively, wherein the additional sensing signals constitute an additional sensing signal set, and each of the additional sensing signals provides at least a size information commensurate with a size of a corresponding one of the additional heat-radiating sources. The processor receives the additional sensing signal set as well as the first sensing signal, and the processor receives a plurality of the additional sensing signal sets at different time points to obtain a plurality of corresponding additional size information, realizes a change of distance between each of the additional heat-radiating sources and the loudspeaker according to respective changes of the additional size information, and generates the volume-adjusting signal according to the change of distance between the first heat-radiating source and the loudspeaker, and the change of distance between each of the additional heat-radiating sources and the loudspeaker. The processor generates the volume-adjusting signal in order to have a volume of the loudspeaker adjusted to a constant level sensed at a middle area among the first heat-radiating source and the additional heat-radiating sources.

In another embodiment, each of the plurality of the first sensing signals further provides a direction information between the first heat-radiating source and the loudspeaker, and each of the plurality of the additional sensing signal sets further provides a direction information between each of the additional heat-radiating sources and the loudspeaker. The processor may further realize a change of direction between the first heat-radiating source and the loudspeaker according to the plurality of the first sensing signals, realizes a change of direction between each of the additional heat-radiating sources and the loudspeaker according to the plurality of the additional sensing signal sets, generates an orientation-adjusting signal according to the change of direction between the first heat-radiating source and the loudspeaker and the change of direction between each of the additional heat-radiating sources and the loudspeaker, and transmits the orientation-adjusting signal to the turning device to determine an orientation of the loudspeaker.

Figure 4A:
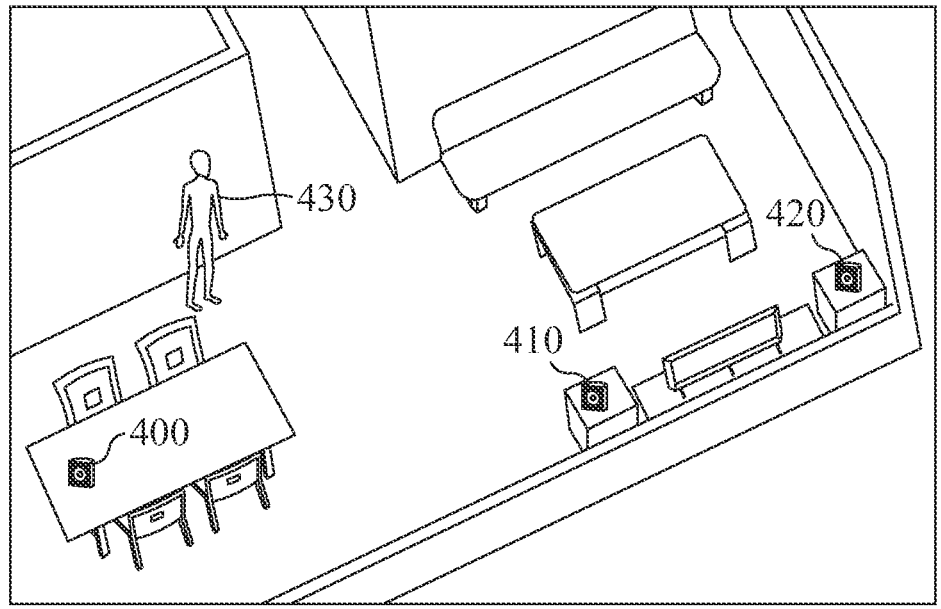
FIG. 4A is a schematic diagram illustrating a detected image of a user at a specified time point.
Figure 4B:
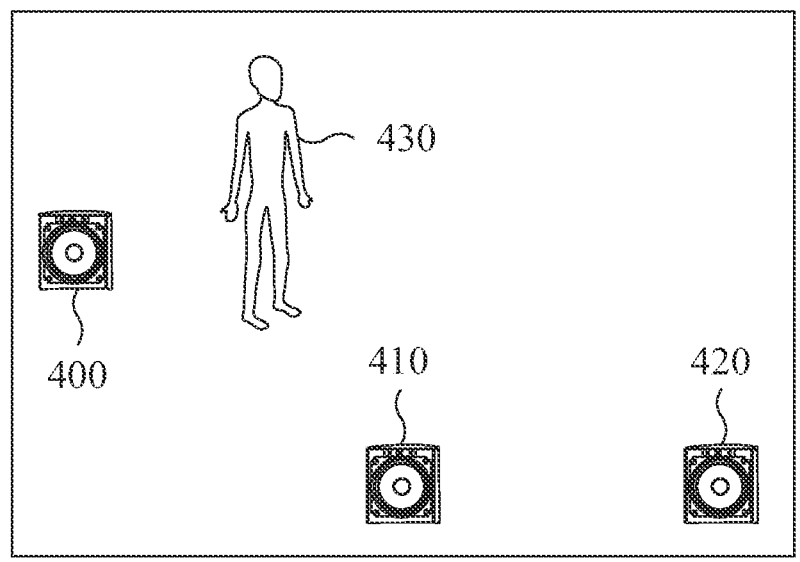
FIG. 4B is a schematic diagram illustrating a position of the user relative to three loudspeakers at the specified time point.
Figure 4C:
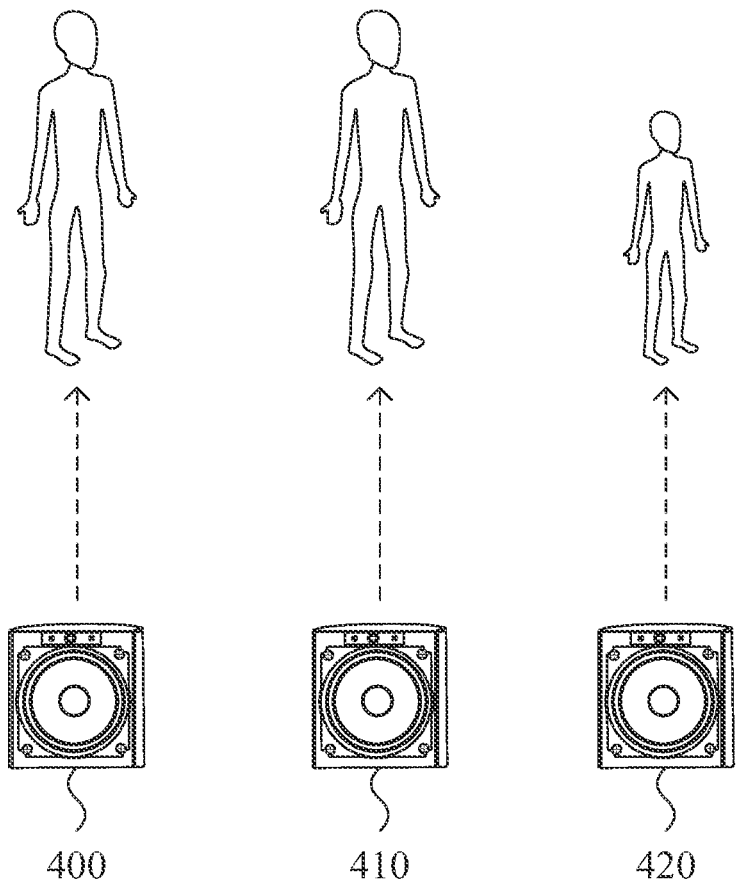
FIG. 4C is a scheme comparing sizes of detected images of the user relative to the three loudspeakers at the specified time point.

Please refer to FIGS. 4A, 4B and 4C, which exemplifies a position of a user 430 in a room relative to the allocation of a stereo system consisting of three loudspeaker 400, 410 and 420 at a specified time point. As shown in FIG. 4A, the user 430 is initially in the upper left area of the room. In this example, the user 430 is closer to the loudspeakers 400 and 410 than the loudspeaker 420, as shown in FIG. 4B. Therefore, as shown in FIG. 4C, the size of image 450A detected by the detecting device disposed on the loudspeaker 400 is substantially equal to the size of image 450B detected by the detecting device disposed on the loudspeaker 410, while the size of image 450C detected by the detecting device disposed on the loudspeaker 420 is apparently smaller.

Figure 5A:
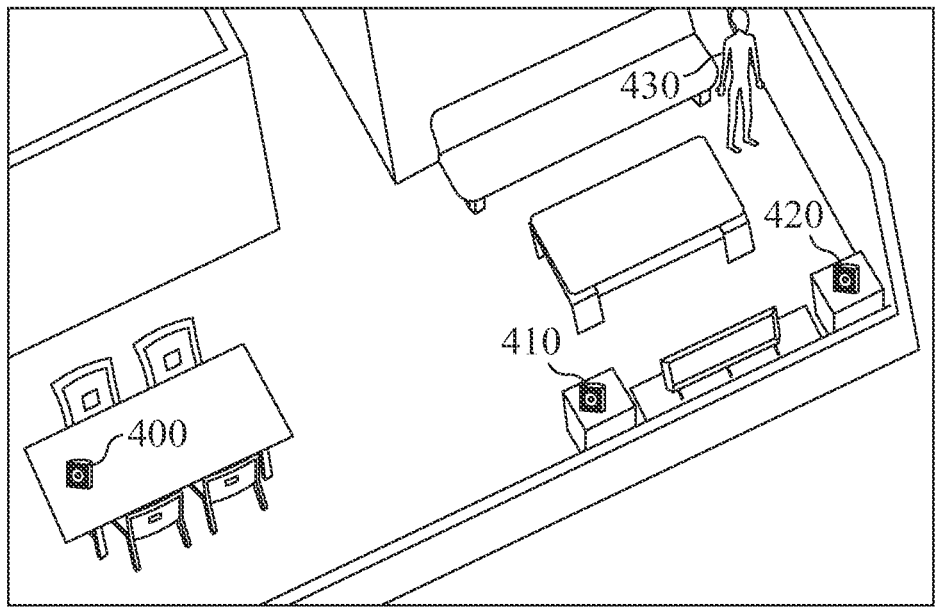
FIG. 5A is a schematic diagram illustrating a detected image of the user at another specified time point.
Figure 5B:
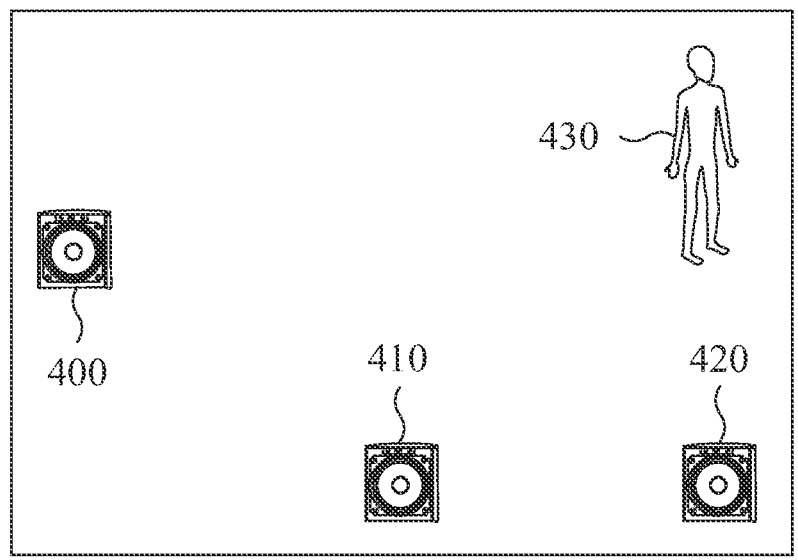
FIG. 5B is a schematic diagram illustrating a position of the user relative to the three loudspeakers at the another specified time point.
Figure 5C:
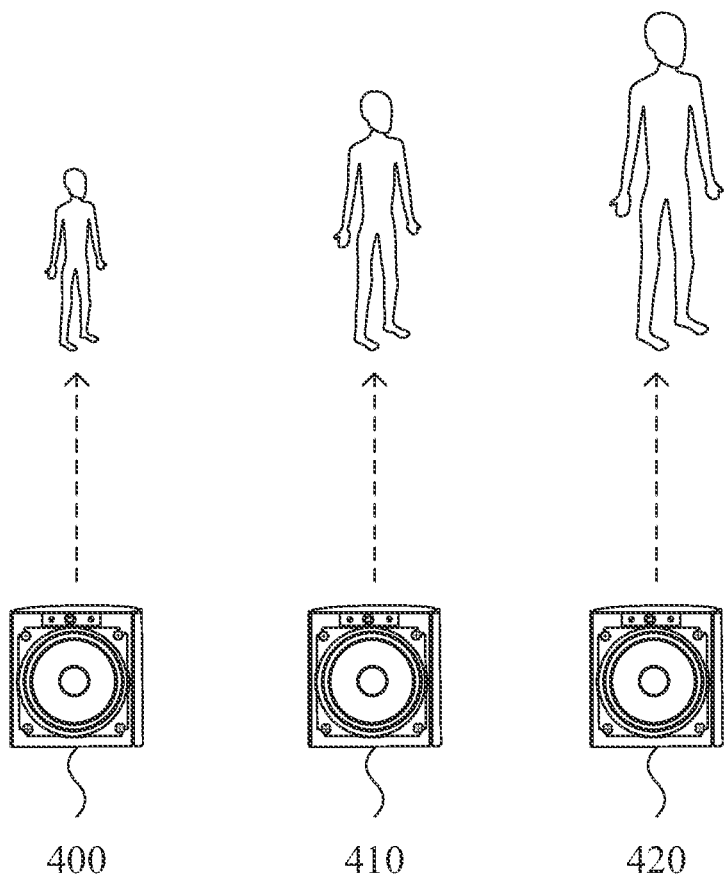
FIG. 5C is a scheme comparing sizes of detected images of the user relative to the three loudspeakers at the another specified time point.

Furthermore, please refer to FIGS. 5A, 5B and 5C, which exemplifies a position of the user 430 in the same room relative to the same stereo system at another specified time point. As shown in FIG. 5A, the user 430 has moved from the upper left area of the room to the upper right area. In this example, the user 430 is closer to the loudspeakers 420 than the loudspeaker 410, and the loudspeaker 400 is the least close, as shown in FIG. 5B. Therefore, as shown in FIG. 5C, the size of image 450D detected by the detecting device disposed on the loudspeaker 400 is the smallest, and the size of image 450E detected by the detecting device disposed on the loudspeaker 410 is smaller than the size of image 450F detected by the detecting device disposed on the loudspeaker 420.

According to the previously mentioned technical description, the processor for controlling the loudspeaker 400 can determine that the distance between the user 430 and the loudspeaker 400 is increased due to the reduction of size from the image 450A to 450D. Therefore, the processor generates the volume-adjusting signal CT to volume up the loudspeaker 400. Likewise, the processor for controlling the loudspeaker 410 can determine that the distance between the user 430 and the loudspeaker 410 is slightly increased due to the slight reduction of size from the image 450B to 450E. Therefore, the processor generates the volume-adjusting signal CT to slight volume up the loudspeaker 410. On the other hand, the processor for controlling the loudspeaker 420 can determine that the distance between the user 430 and the loudspeaker 420 is decreased due to the enlargement of size from the image 450C to 450F. Therefore, the processor generates the volume-adjusting signal CT to properly volume down the loudspeaker 420.

It is to be noted that the volume adjustment of the loudspeakers 400, 410 and 420 may be carried out by their respective processors, or the volume adjustment of two of them is carried out by the same processor while the volume adjustment of the other loudspeaker is carried out by another processor. It is also feasible to have the volume adjustment of all the loudspeakers carried out by the same processor. Furthermore, one or more turning devices, if provided, are also controlled by the processor or processors for orientation adjustment of the one or some or all of the loudspeakers 400, 410 and 420. Since the volume and/or orientation adjustment of the loudspeaker or loudspeakers performed by the processor or processors have been clearly described above, they are not to be repeated herein.

It is understood from the above descriptions that by way of the loudspeaker control system according to the present invention, automatic volume and/or orientation adjustment of a stereo system consisting of one or more loudspeakers can be used in a variety of spaces, such as theaters, home rooms, or mobile vehicles e.g., cars, to reduce the hassle of manually adjusting the speaker volume for listeners or occupants.

In summary, the loudspeaker control system according to the present invention detects the images of a user at different time points by way of, for example, sensing IR radiation of the heat-radiating source, to obtain the positions and sizes of the heat-radiating source. Then the spatial relationship between the heat-radiating source and the loudspeaker, e.g., distance and/or direction changes, can be determined according to the position and size changes of the detected images. Afterwards, volume and/or orientation adjustment of the loudspeaker can be made according to the spatial relationship between the heat-radiating source and the loudspeaker. Accordingly, parameter or parameters of the loudspeaker can be automatically adjusted so as to save the troublesome work of manual adjustment during the music appreciation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A loudspeaker control system, comprising:
a loudspeaker;
a detecting device generating at least two sensing signals in response to presence of a target object in a sensing area at sequential time points, each of the at least two sensing signal containing a size information of the target object;
wherein the target object is a heat-radiating source, and the detecting device includes an infrared sensor for sensing the heat-radiating source to obtain a first detected image and a second detected image of the target object at a first time point and a second time point, respectively, and estimates a first size of detected image obtained at the first time point and a second size of detected image obtained at the second time point; and
a processor electrically connected to the detecting device, receiving the at least two sensing signals, and optionally generating an adjustment signal for adjusting at least one parameter of the loudspeaker according to the size information of the target object contained in the at least two sensing signals;
wherein the loudspeaker control system further comprises a turning device, which is in communication with the processor and coupled to the loudspeaker for adjusting the orientation of the loudspeaker in response to the adjusting signal.

2. The loudspeaker control system according to claim 1, wherein the infrared sensor is fixedly disposed relative to the loudspeaker.

3. The loudspeaker control system according to claim 1, wherein the infrared sensor is a pyroelectric infrared (PIR) sensor.

4. The loudspeaker control system according to claim 1, wherein the processor generates the adjustment signal when the first size of the detected image obtained at the first time point and the second size of the detected image obtained at the second time point are different.

5. The loudspeaker control system according to claim 4, wherein in response to the adjusting signal, a volume of the loudspeaker is adjusted in response to a change from the first size to the second size.

6. The loudspeaker control system according to claim 5, wherein the processor generates the adjustment signal when the first size of the detected image obtained at the first time point and the second size of the detected image obtained at the second time point are different, and/or when a first location of the detected image obtained at the first time point and a second location of the detected image obtained at the second time point are different.

7. The loudspeaker control system according to claim 6, wherein in response to the adjusting signal, a volume of the loudspeaker is adjusted in response to a change from the first size to the second size, and/or an orientation of the loudspeaker is adjusted in response to a change from the first location to the second location.

8. The loudspeaker control system according to claim 1, wherein each of the at least two sensing signal further contains a location information of the target object, and the processor optionally generates the adjustment signal for adjusting the at least one parameter of the loudspeaker according to the size information and the location information of the target object contained in the at least two sensing signals.

9. A system for automatically adjusting a volume of a loudspeaker, comprising:
a loudspeaker disposed thereon an infrared sensor, which generates a first sensing signal when sensing IR radiation from a first heat-radiating source, wherein the first sensing signal provides at least a first size information commensurate with a size of the first heat-radiating source; and
a processor electrically connected to the infrared sensor, receiving a plurality of the first sensing signals at different time points to obtain a plurality of corresponding first size information, realizing a change of distance between the first heat-radiating source and the loudspeaker according to a change of the first size information, and generating a volume-adjusting signal according to the change of distance between the first heat-radiating source and the loudspeaker,
wherein the volume-adjusting signal is transmitted to the loudspeaker to adjust the volume of the loudspeaker accordingly; and
wherein the system further comprises a turning device, which is in communication with the processor and coupled to the loudspeaker for adjusting the orientation of the loudspeaker in response to the adjusting signal.

10. The system according to claim 9, wherein the processor generates the volume-adjusting signal to have a volume of the loudspeaker adjusted to a constant level sensed at a location of the heat-radiating source.

11. The system according to claim 9, further comprising a turning device connected to the loudspeaker and electrically coupled to the processor, wherein the processor realizes a change of direction between the first heat-radiating source and the loudspeaker according to the plurality of the first sensing signals, generates an orientation-adjusting signal according to the change of direction between the first heat-radiating source and the loudspeaker, and transmits the orientation-adjusting signal to the turning device to determine an orientation of the loudspeaker, wherein each of the plurality of the first sensing signals further provides a direction information between the first heat-radiating source and the loudspeaker.

12. The system according to claim 9, wherein
when the infrared sensor senses IR radiation from a second heat-radiating source in addition to the IR radiation from the first heat-radiating source, the infrared sensor generates a second sensing signal corresponding to the IR radiation from the second heat-radiating source, wherein the second sensing signal provides at least a second size information commensurate with a size of the second heat-radiating source; and
the processor receives the second sensing signal as well as the first sensing signal, and the processor receives a plurality of the second sensing signals at different time points to obtain a plurality of corresponding second size information, realizes a change of distance between the second heat-radiating source and the loudspeaker according to a change of the second size information, and generates the volume-adjusting signal according to the change of distance between the first heat-radiating source and the loudspeaker, and the change of distance between the second heat-radiating source and the loudspeaker.

13. The system according to claim 12, wherein the processor generates the volume-adjusting signal to have a volume of the loudspeaker adjusted to a constant level sensed at a middle point of the first heat-radiating source and the second heat-radiating source.

14. The system according to claim 12, further comprising a turning device connected to the loudspeaker and electrically coupled to the processor, wherein the processor realizes a change of direction between the first heat-radiating source and the loudspeaker according to the plurality of the first sensing signals, realizes another change of direction between the second heat-radiating source and the loudspeaker according to the plurality of the second sensing signals, generates an orientation-adjusting signal according to the change of direction between the first heat-radiating source and the loudspeaker and the another change of direction between the second heat-radiating source and the loudspeaker, and transmits the orientation-adjusting signal to the turning device to determine an orientation of the loudspeaker, wherein each of the plurality of the first sensing signals further provides a direction information between the first heat-radiating source and the loudspeaker, and each of the plurality of the second sensing signals further provides a direction information between the second heat-radiating source and the loudspeaker.

15. The system according to claim 9, wherein
when the infrared sensor senses IR radiation from additional heat-radiating sources in addition to the IR radiation from the first heat-radiating source, the infrared sensor generates additional sensing signals corresponding to the IR radiation of the additional heat-radiating sources, respectively, wherein the additional sensing signals constitute an additional sensing signal set, and each of the additional sensing signals provides at least a size information commensurate with a size of a corresponding one of the additional heat-radiating sources; and the processor receives the additional sensing signal set as well as the first sensing signal, and the processor receives a plurality of the additional sensing signal sets at different time points to obtain a plurality of corresponding additional size information, realizes a change of distance between each of the additional heat-radiating sources and the loudspeaker according to respective changes of the additional size information, and generates the volume-adjusting signal according to the change of distance between the first heat-radiating source and the loudspeaker, and the change of distance between each of the additional heat-radiating sources and the loudspeaker.

16. The system according to claim 15, wherein the processor generates the volume-adjusting signal to have a volume of the loudspeaker adjusted to a constant level sensed at a middle area among the first heat-radiating source and the additional heat-radiating sources.

17. The system according to claim 15, further comprising a turning device connected to the loudspeaker and electrically coupled to the processor, wherein the processor realizes a change of direction between the first heat-radiating source and the loudspeaker according to the plurality of the first sensing signals, realizes a change of direction between each of the additional heat-radiating sources and the loudspeaker according to the plurality of the additional sensing signal sets, generates an orientation-adjusting signal according to the change of direction between the first heat-radiating source and the loudspeaker and the change of direction between each of the additional heat-radiating sources and the loudspeaker, and transmits the orientation-adjusting signal to the turning device to determine an orientation of the loudspeaker, wherein each of the plurality of the first sensing signals further provides a direction information between the first heat-radiating source and the loudspeaker, and each of the plurality of the additional sensing signal sets further provides a direction information between each of the additional heat-radiating sources and the loudspeaker.

18. The system according to claim 9, wherein the infrared sensor is a pyroelectric infrared (PIR) sensor.

* * * * *